US012305844B1

(12) United States Patent
He

(10) Patent No.: US 12,305,844 B1
(45) Date of Patent: May 20, 2025

(54) BALL LAMP

(71) Applicant: QUANZHOU DECTECH CO., LTD, Fujian (CN)

(72) Inventor: Ke He, Fujian (CN)

(73) Assignee: QUANZHOU DECTECH CO., LTD, Fujian (CN)

( * ) Notice: Subject to any disclaimer, the term of this patent is extended or adjusted under 35 U.S.C. 154(b) by 0 days.

(21) Appl. No.: 18/775,001

(22) Filed: Jul. 17, 2024

(30) Foreign Application Priority Data

May 17, 2024 (CN) ......................... 202410619880.4

(51) Int. Cl.

| | |
|---|---|
| ***F21V 3/02*** | (2006.01) |
| ***F21S 9/02*** | (2006.01) |
| ***F21V 21/008*** | (2006.01) |
| ***F21V 23/00*** | (2015.01) |
| ***F21V 23/04*** | (2006.01) |

(52) U.S. Cl.

CPC .................. *F21V 3/02* (2013.01); *F21S 9/02* (2013.01); *F21V 21/008* (2013.01); *F21V 23/002* (2013.01); *F21V 23/003* (2013.01); *F21V 23/04* (2013.01)

(58) Field of Classification Search

CPC ........ F21V 3/02; F21V 21/008; F21V 23/002; F21V 23/003; F21V 23/04; F21S 9/02

See application file for complete search history.

(56) References Cited

U.S. PATENT DOCUMENTS

| | | | | |
|---|---|---|---|---|
| 11,365,865 | B1 * | 6/2022 | Zheng | F21V 1/10 |
| 11,473,754 | B1 * | 10/2022 | Wu | F21V 3/02 |
| 11,662,069 | B1 * | 5/2023 | Huang | F21V 1/06 362/183 |
| 12,117,152 | B1 * | 10/2024 | Almoaibed | F21S 6/002 |
| 12,146,627 | B1 * | 11/2024 | Xu | F21S 2/005 |
| 2024/0297537 | A1 * | 9/2024 | Wang | H02J 50/90 |

* cited by examiner

*Primary Examiner* — Christopher E Dunay

(74) *Attorney, Agent, or Firm* — Cooper Legal Group, LLC

(57) ABSTRACT

A ball lamp is provided, including a spherical lampshade. An outer wall of the spherical lampshade is provided with a hanging part and a supporting part, the supporting part is located on a side of a central axis of the hanging part and a center of a ball, the spherical lampshade is provided with a lighting device, and the lighting device provides a light source for interior of the spherical lampshade.

8 Claims, 16 Drawing Sheets

A-A

A-A

A

B-B

C-C

D-D

B

C

BALL LAMP

CROSS-REFERENCE TO RELATED APPLICATION

The present application claims the priority benefits of China patent application No. 202410619880.4, filed on May 17, 2024. The entirety of China patent application No. 202410619880.4 is hereby incorporated by reference herein and made a part of this specification.

TECHNICAL FIELD

The present application relates to a technical field of lamps, and in particular, relates to a ball lamp.

BACKGROUND ART

A ball lamp is a decorative lamp. An existing ball lamp generally includes a spherical lampshade, a hanging part is fixed on an outer wall of the spherical lampshade and a hanging ring is fixed on the hanging part. The ball lamp is fixed via the hanging ring for decoration. The spherical lampshade is provided with a light source inside, making it convenient for the ball lamp to emit light.

The ball lamp is usually hanged at a high place for decoration, such as on a Christmas tree or a wall. If it needs to place the ball lamp in a horizontal position such as a ground or tabletop for decoration, the ball lamp will roll in the horizontal position, resulting in limited usage scenario of the ball lamp.

SUMMARY

In order to increase a usage scenario of a ball lamp, the present application provides a ball lamp.

The ball lamp provided in the present application adopts the following technical solution.

A ball lamp includes a spherical lampshade, an outer wall of the spherical lampshade is provided with a hanging part and a supporting part, the supporting part is located on a side of a central axis passing through the hanging part and a center of a ball, the spherical lampshade is provided with a lighting device, and the lighting device provides a light source for an inside of the spherical lampshade.

By adopting the above technical solution, when it is needed to hang the ball lamp, the ball lamp is hung via the hanging part for decoration. When it is needed to place the ball lamp in a horizontal position for decoration, the ball lamp is placed flat in the horizontal position through the supporting part, thereby increasing a usage scenario of the ball lamp. When performing decoration by using the ball lamp, the lighting device emits light, thereby improving a decorative effect of the ball lamp Optionally, the lighting device includes a first light-emitting element, a battery compartment, a blocking element, and a circuit board, the battery compartment has a battery port for receiving a battery, the blocking element is detachably installed on the battery port of the battery compartment, the first light-emitting element is electrically connected to the circuit board, and the circuit board is provided with a voltage regulation circuit. The voltage regulation circuit is configured to supply power to the first light-emitting element after regulating a voltage output by the battery, the circuit board is fixedly installed on the battery compartment, and the first light-emitting element is provided in the spherical lampshade.

By adopting the above technical solution, after putting the battery into the battery compartment, the battery supplies power to the circuit board through the conductive assembly, the voltage regulation circuit on the circuit board is configured to regulate the voltage output by the battery and supply power to the first light-emitting element to allow the first light-emitting element to emit light.

Optionally, the lighting device is installed on the hanging part, and the battery compartment is cylindrical in shape. The blocking element is a threaded cover, and an end of the battery compartment is fixed through the hanging part, an end of the battery compartment with the battery port facing an outside of the spherical lampshade, and the blocking element is threaded on the end of the battery compartment with the battery port. The circuit board is fixedly installed on a side of the battery compartment facing the inside of the spherical lampshade, and the first light-emitting element is fixedly installed on the circuit board.

By adopting the above technical solution, the lighting device is integrated with the hanging part to reduce the modification needed for the spherical lampshade and facilitate a production of the spherical lampshade. In addition, the lighting device also serves as the hanging part, rendering convenient hang up of the ball lamp.

Optionally, the battery compartment is installed with a conductive assembly, the conductive assembly comprises a first conductive spring, a second conductive strip, a first switch, a third conductive strip, a conductive column, a conductive ring, and a conductive wire, the conductive column is fixedly embedded at an end of the battery compartment departing from the blocking element, the first conductive spring is fixedly installed on an inner wall of the battery compartment departing from the blocking element, a first end of the conductive column is electrically connected to the circuit board, a second end of the conductive column is fixedly connected to a first end of the first conductive spring, a second end of the first conductive spring is configured to abut against the battery, the second conductive strip and the third conductive strip are fixedly installed on an inner wall of the blocking element, the first switch is fixedly installed on the blocking element, a first end of the first switch is electrically connected to the second conductive strip, a second end of the first switch is electrically connected to the third conductive strip, the conductive ring is fixedly installed on a side of the hanging part departing from the spherical lampshade, the second conductive strip is configured to abut against the battery, and the third conductive strip is configured to abut against the conductive ring, the conductive wire is buried in a side wall of the battery compartment, and a first end of the conductive wire is fixedly connected to the conductive ring, a second end of the conductive wire is electrically connected to the circuit board.

By adopting the above technical solution, after screwing the blocking element into the battery compartment, an end of the battery is electrically connected to the circuit board through the conductive column and the first conductive spring, while the other end of the battery is electrically connected to the circuit board through the second conductive strip, the first switch, the third conductive strip, the conductive ring, and the conductive wire, making it convenient for the battery to supply power to the voltage regulation circuit. By pressing the first switch, connection/disconnection between the voltage regulation circuit on the circuit board and the battery is achieved.

Optionally, the lighting device is installed on the supporting part, and the battery compartment is rectangular in shape, the battery compartment is fixedly installed on the supporting part, and a side of the battery compartment with the battery port is provided facing an outside of the spherical lampshade, the blocking element is in a shape of a plate, and the blocking element is configured to cover the battery port.

By adopting the above technical solution, the lighting device is located on the supporting part, and due to a large area of the supporting part, a size of the battery compartment is increased, thereby increasing a number of the battery placed and improving a power level Optionally, on a side facing the inside of the spherical lampshade, a second light-emitting element is installed on the supporting part, a positive pin and a negative pin of the second light-emitting element are both electrically connected to a second wire, and an end of the second wire departing from the second light-emitting element is electrically connected to the lighting device. The lighting device is configured to supply power to the second light-emitting element, the supporting part is elastic, and the supporting part is configured to be bent outward towards the spherical lampshade.

By adopting the above technical solution, the second light-emitting element emits light at the supporting part, thereby improving an uniformity of a light emitted by the ball lamp. When placing the ball lamp in the horizontal position, the supporting part abuts against at the horizontal position, causing the supporting part to move towards the inside of the spherical lampshade, so that the spherical lampshade can be placed flat in the horizontal position. When the ball lamp is hung up, the supporting part is bent towards the outside of the spherical lampshade, thereby improving the decorative effect of the ball lamp.

Optionally, the positive pin of the second light-emitting element is fixedly connected to an insulation rod, and an end of the insulation rod departing from the second light-emitting element is fixedly connected to a side of the supporting part facing the inside of the spherical lampshade, the second light-emitting element is provided with a connecting base, and the connecting base is provided with a sliding hole, the positive pin and the negative pin of the second light-emitting element are both inserted from an end departing from the supporting part through the sliding hole, an inside of the sliding hole is defined with a first conductive strip, and the first conductive strip is elastic. An end of the second wire facing the second light-emitting element is fixedly connected to a side of the first conductive strip, and both of them are fixedly buried in the connecting base. A fixing rod is fixedly installed between the connecting base and an inner wall of the spherical lampshade.

By adopting the above technical solution, when placing the ball lamp in the horizontal position, the supporting part deforms towards the inside of the spherical lampshade. When the supporting part deforms towards the inside of the spherical lampshade, it drives the insulation rod to move, causing the positive pin of the second light-emitting element to separate from the first conductive strip, thereby the second light-emitting element goes out. When placing the ball lamp in the horizontal position, the second light-emitting element is turned off, achieving an energy-saving effect. When hanging the ball lamp, the supporting part is restored, which drives the insulation rod to move towards the outside of the spherical lampshade, causing the positive pin of the second light-emitting element to abut against the first conductive strip, thereby causing the second light-emitting element to light up. By lighting the supporting part with a second light-emitting element, the uniformity of the light emission of the ball lamp is improved.

Optionally, a lamp body of the second light-emitting element is located between the supporting part and the connecting base, and the positive pin and the negative pin of the second light-emitting element are both inserted from an end of the sliding hole departing from the supporting part in a bent manner.

By adopting the above technical solution, a situation where the connecting base blocks the light emitted by the second light-emitting element is avoided.

Optionally, when the supporting part is not compressed, the positive pin and the negative pin of the second light-emitting element abut against a side of the connecting base departing from the supporting part.

By adopting the above technical solution, when hanging the ball lamp, the positive pin and the negative pin of the second light-emitting element abut against the side of the connecting base departing from the supporting part, thereby reducing the situation where the supporting part is partially protruding due to a compression of the insulation rod.

Optionally, a first connecting rod is fixedly installed in a middle of the supporting part, and a second connecting rod is fixedly installed between an end of the first connecting rod departing from the supporting part and the insulation rod.

By adopting the above technical solution, each insulation rod is connected to the middle of the supporting part through the first connecting rod and the second connecting rod, thereby increasing a movement distance of the insulation rod and facilitating a control of connection/disconnection between the first conductive strip and the positive pin of the second light-emitting element. In addition, the movement distance of each insulation rod is equal, making it convenient to set a length of the insulation rod and the positive pin of the second light-emitting element.

Optionally, the battery compartment is cylindrical in shape, and the blocking element is a threaded cover. The end of the battery compartment with the battery port is fixed through the hanging part, and the blocking element is threadedly provided in the end of the battery compartment with the battery port, the hanging ring is fixedly installed on the blocking element, and the circuit board is fixedly installed on an end of the battery compartment facing an inside of the spherical lampshade. The conductive assembly is installed between the battery compartment and the threaded cover, and the conductive assembly is configured for electrically connecting the battery and the circuit board.

By adopting the above technical solution, when screwing out the blocking element, the battery port is exposed, making it convenient to insert the battery into the battery compartment through the battery port. After the battery is placed inside the battery compartment, the blocking element is screwed into the battery compartment to reduce the possibility of the battery sliding out of the battery port.

In summary, the present application can achieve at least one of the following beneficial technical effects.

1. When hanging up the ball lamp, the ball lamp is hung via the hanging ring. When the ball lamp needs to be placed in the horizontal position, the supporting part abuts against the horizontal position to prevent the ball lamp from rolling, thereby increasing the usage scenario of the ball lamp;
2. When hanging the ball lamp, the supporting part bends towards the outside of the spherical lampshade, providing uniform curvature of an outer wall of the ball lamp, thereby improving the decorative effect of the ball lamp during hanging; and
3. when placing the ball lamp in the horizontal position, the supporting part drives the positive pin of the second light-emitting element to separate from the first conductive strip through the insulation rod, disconnecting the second light-emitting element from the battery, and turning off the second light-emitting element to achieve energy-saving effect.

DETAILED DESCRIPTION

The present application is further described in detail below with reference to FIGS. 1-16.

A ball lamp is provided according to embodiments of the present application.

Embodiment 1

Figure 1:
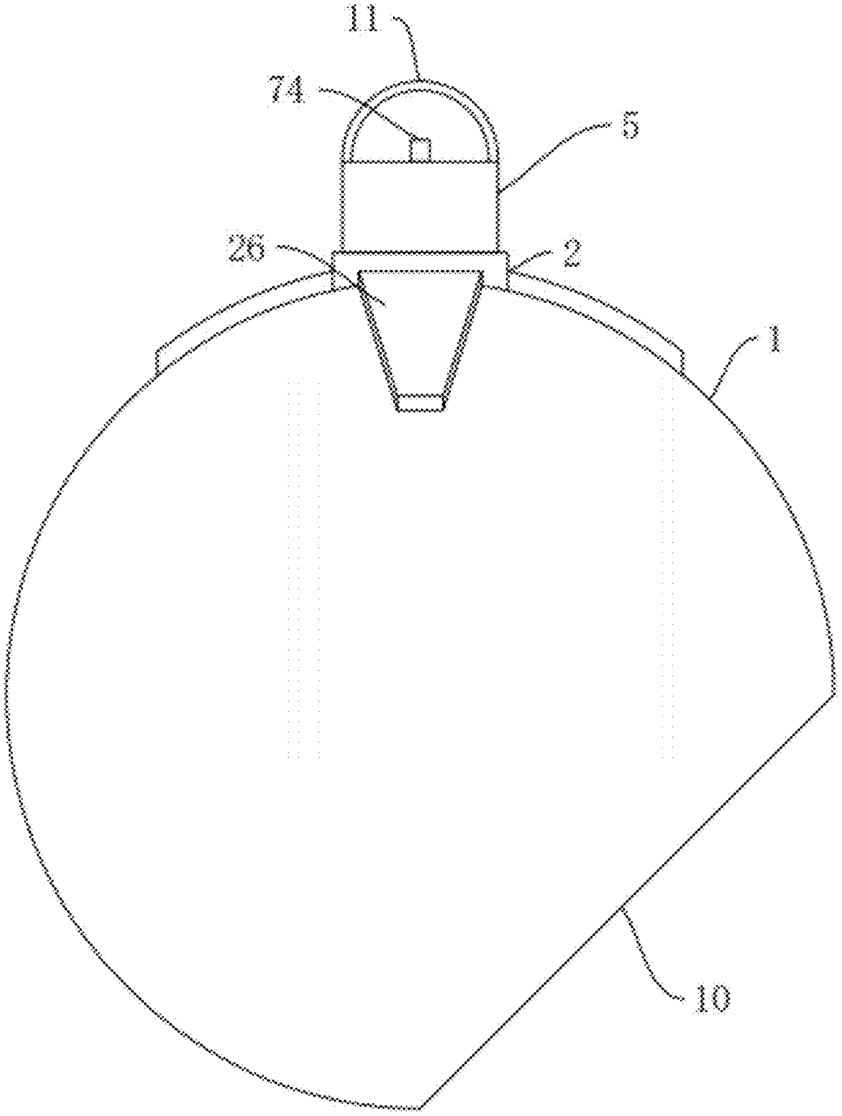
FIG. 1 is an overall schematic structure view of a first perspective according to Embodiment 1 of the present application.
Figure 2:
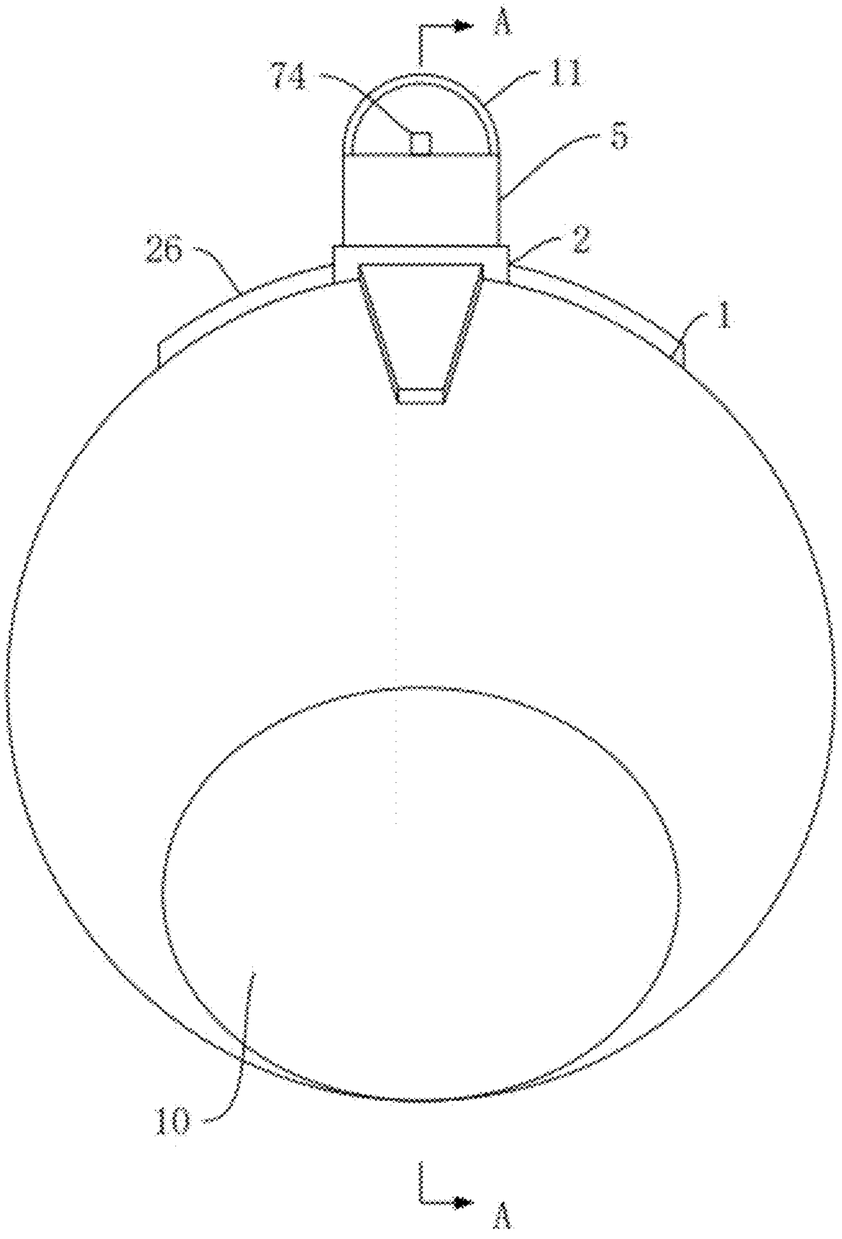
FIG. 2 is an overall schematic structure view of a second perspective according to Embodiment 1 of the present application.

Referring to FIGS. 1 and 2, a ball lamp includes a spherical lampshade 1, which is made of transparent materials such as glass and plastic. The spherical lampshade 1 is provided with a hanging part 2.

Figure 3:
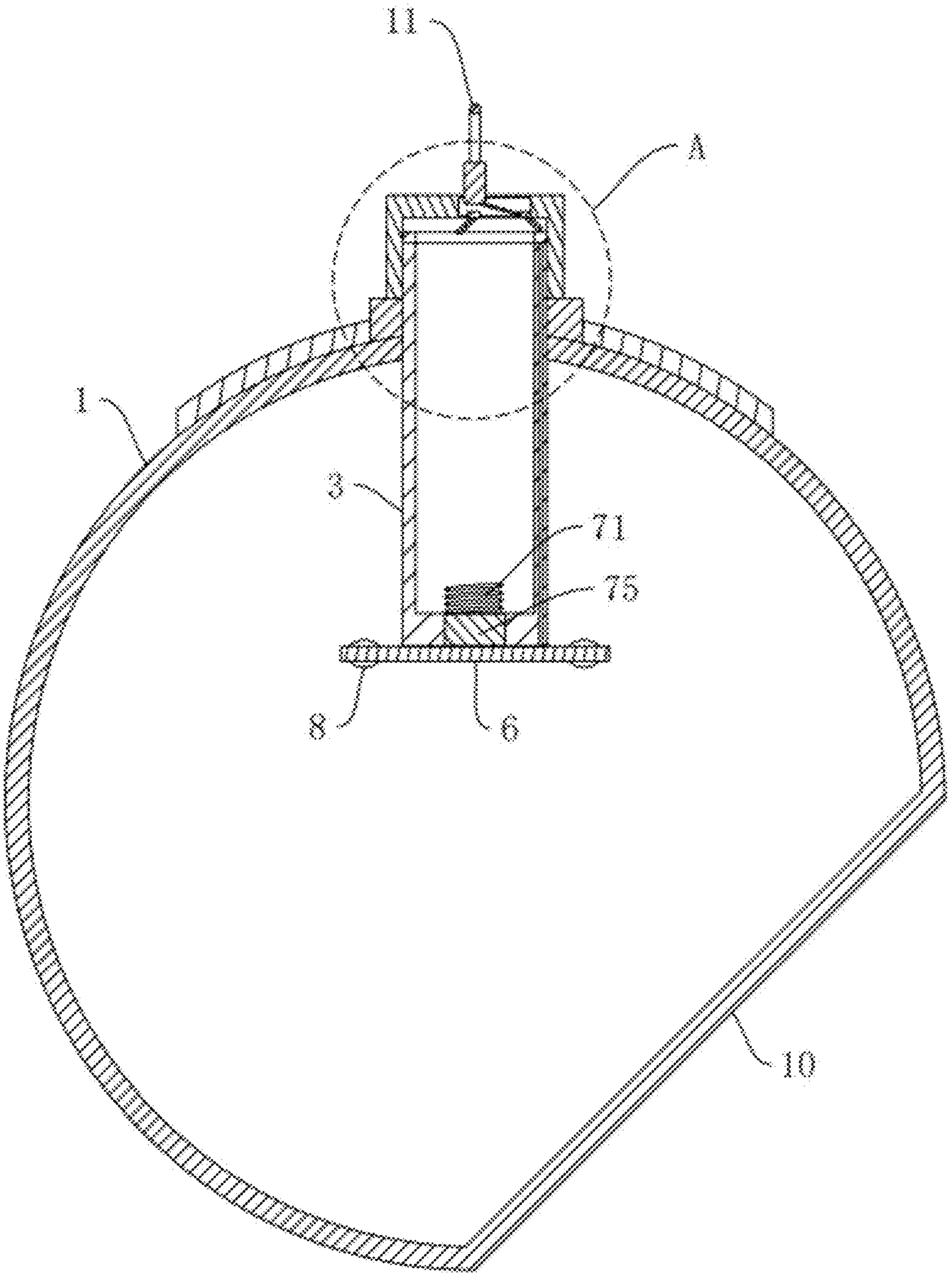
FIG. 3 is a schematic cross-sectional view along line A-A in FIG. 2.
Figure 4:
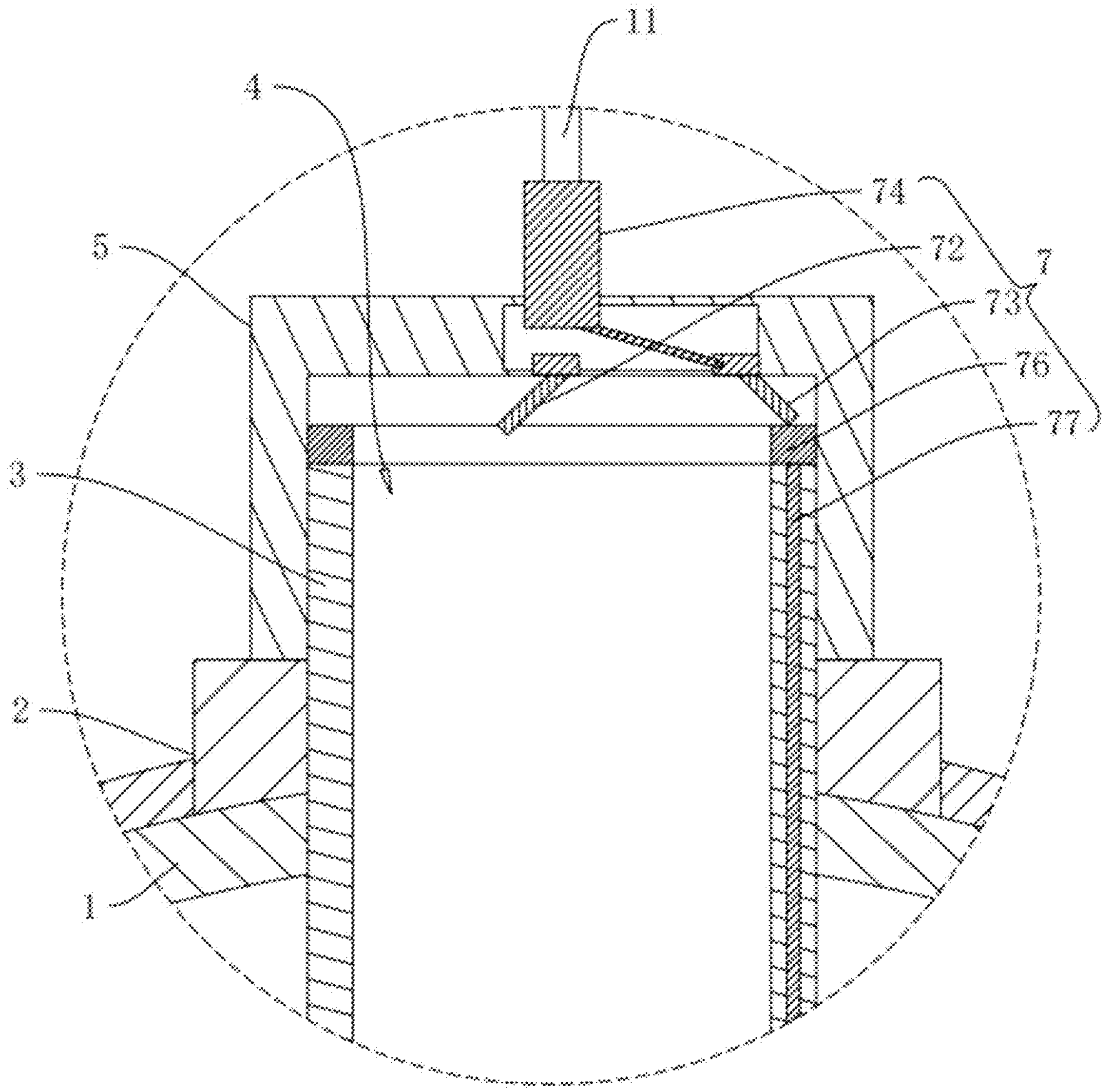
FIG. 4 is an enlarged view of Portion A in FIG. 3.

Referring to FIGS. 3 and 4, the spherical lampshade 1 is provided with a lighting device, which provides a light source for an interior of the spherical lampshade 1. The lighting device includes a first light-emitting element 8, a battery compartment 3, a blocking element 5, and a circuit board 6. The battery compartment 3 is cylindrical in shape, and an end of the battery compartment 3 extends through the hanging part 2 and is fixed by the latter. A manufacturing process of the spherical lampshade 1 is generally complex. By installing the battery compartment 3 on the hanging part 2, it can reduce changes required for the spherical lampshade 1, thereby reducing a difficulty in manufacturing the spherical lampshade 1.

There is a battery port 4 at an end of the battery compartment 3 that passes through the hanging part 2. The battery port 4 is configured to place a battery into the battery compartment 3. The battery includes button batteries, lithium batteries, or dry batteries. In the embodiment of the present application, the battery is a dry battery, and there are two batteries placed inside the battery compartment 3, which are connected in series.

A reinforcing plate 26 is fixedly installed on a peripheral wall of the battery compartment 3, and a side of the reinforcing plate 26 is fixedly installed on an outer wall of the spherical lampshade 1, thereby enhancing firmness of fixing the battery compartment 3 onto the hanging part 2.

The blocking element 5 is a threaded cover, which is screwed into the end of the hanging part 2 of the battery compartment 3 to block the battery port 4 and reduce an occurrence of the battery sliding out of the battery port 4.

The circuit board 6 is fixedly installed at the end of the battery compartment 3 departing from the blocking element 5, and the circuit board 6 is provided with a voltage regulation circuit. A conductive assembly 7 is installed between the battery compartment 3 and the blocking element 5, the conductive assembly 7 includes a first conductive spring 71, a second conductive strip 72, a first switch 74, a third conductive strip 73, a conductive column 75, a conductive ring 76, and a conductive wire 77.

Referring to FIGS. 3 and 4, the conductive column 75 is fixedly embedded in an end of the battery compartment 3 departing from the blocking element 5, and the first conductive spring 71 is fixedly installed on an inner wall of the battery compartment 3 departing from the blocking element 5. An end of the conductive column 75 is electrically connected to the circuit board 6, the other end of the conductive column 75 is fixedly connected to an end of the first conductive spring 71, and the other end of the first conductive spring 71 is configured to abut against an end of the battery.

Referring to FIGS. 3 and 4, the first switch 74 is fixedly installed on the blocking element 5, while the second conductive strip 72 and the third conductive strip 73 are fixedly installed on an inner wall of the blocking element 5. An end of the first switch 74 is fixedly connected to a side of the second conductive strip 72, and the other end of the first switch 74 is fixedly connected to a side of the third conductive strip 73. The first switch 74 is configured to control connection/disconnection between the second conductive strip 72 and the third conductive strip 73. Both of the second conductive strip 72 and the third conductive strip 73 are elastic, and a side of the second conductive strip 72 departing from the first switch 74 is configured to tightly abut against the battery inside the battery compartment 3.

Referring to FIGS. 3 and 4, the conductive ring 76 is fixedly installed at an end of the battery compartment 3 facing the blocking element 5, and the third conductive strip 73 is configured to tightly abut against the conductive ring 76 on a side departing from the first switch 74. The conductive wire 77 is buried in a side wall of the battery compartment 3, an end of the conductive wire 77 is fixedly connected to the conductive ring 76, and the other end of the conductive wire 77 is electrically connected to the circuit board 6.

After placing the battery inside the battery compartment 3, the blocking element 5 is screwed into the battery compartment 3. The end of the battery is sequentially connected to the circuit board 6 through the first conductive spring 71 and the conductive column 75, while the other end of the battery is sequentially connected to the voltage regulation circuit on the circuit board 6 through the second conductive strip 72, the first switch 74, the third conductive strip 73, the conductive ring 76, and the conductive wire 77, thereby facilitating the voltage regulation circuit on the circuit board 6 to regulate the voltage output by the battery. When the blocking element 5 is screwed into the battery compartment 3, the third conductive strip 73 will rotate with the blocking element 5. By the conductive ring 76 abutting against the third conductive strip 73, a reliability of an electrical connection between the battery and the voltage regulation circuit on circuit board 6 can be improved.

Referring to FIG. 3, the spherical lampshade 1 is provided with a first light-emitting element 8 inside, which is an LED light. There are a plurality of first light-emitting elements 8. Each first light-emitting element 8 is connected in parallel to the voltage regulation circuit on the circuit board 6. The voltage regulation circuit on the circuit board 6 regulates the voltage output by the battery and supplies power to the first light-emitting element 8.

In the embodiment of the present application, the first light-emitting element 8 is integrated on the circuit board 6, thereby facilitating the electrical connection between the first light-emitting element 8 and the circuit board 6. In another embodiment, the first light-emitting element 8 is fixedly installed on the peripheral wall of the battery compartment 3, thereby improving an uniformity of a light emission of the ball lamp.

The spherical lampshade 1 is provided with a supporting part 10. A hanging ring 11 is fixedly installed on an outer wall of the blocking element 5 departing from the spherical lampshade 1. The hanging ring 11 is installed on the hanging part 2 through the blocking element 5, thereby reducing a situation where the hanging ring 11 hinders the blocking element 5 from rotating into the hanging part 2.

When it is necessary to hang the ball lamp, it is hung up through the hanging ring 11. When it is necessary to place the ball lamp in a horizontal position, the supporting part 10 is placed in the horizontal position to increase a usage scenario of the ball lamp.

The supporting part 10 is located on a side of a central axis where the hanging part 2 and a ball center are located. When the ball lamp is hung on a Christmas tree or a wall, the supporting part 10 is located on a side of the spherical lampshade 1 facing the Christmas tree or wall, which is conducive to hiding the supporting part 10 and improving a decorative effect of the ball lamp.

An implementation principle of the ball lamp in the embodiment of the present application is: by hanging the ball lamp through the hanging ring 11, or by placing the ball lamp in the horizontal position on the supporting part 10, the usage scenario of the ball lamp is increased. After placing the ball lamp, the first switch 74 is turned on, and the voltage regulation circuit on the circuit board 6 adjusts the power output of the battery to supply power to the first light-emitting element 8. The first light-emitting element 8 emits light, thereby improving the decorative effect of the ball lamp.

Embodiment 2

Figure 5:
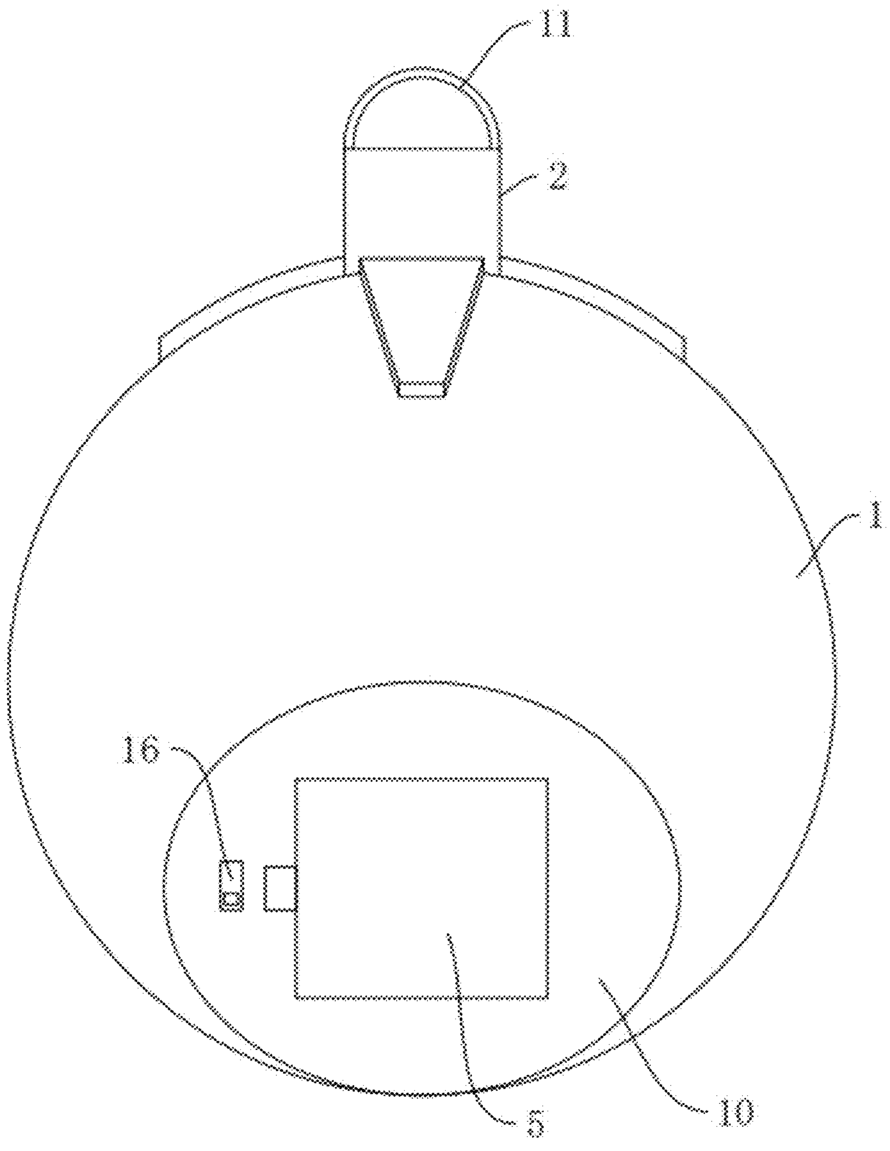
FIG. 5 is an overall schematic structure view according to Embodiment 2 of the present application.
Figure 6:
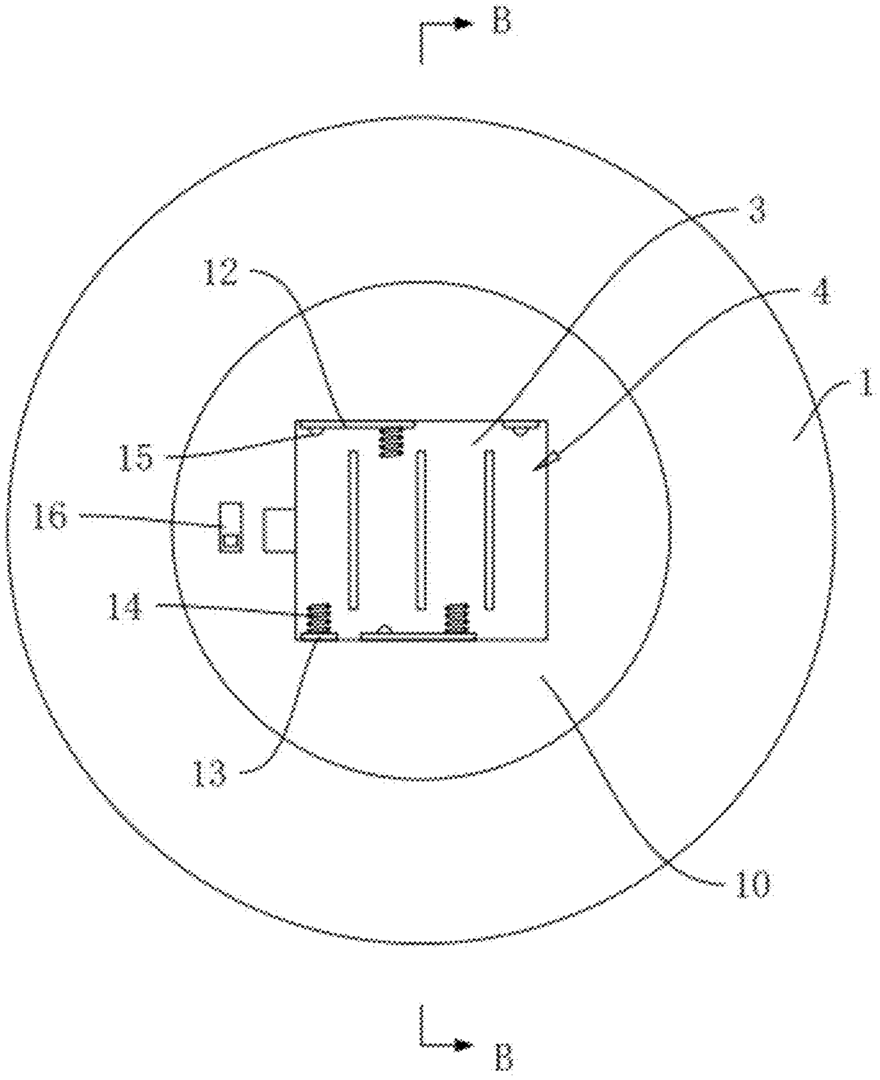
FIG. 6 is a schematic structure view of a blocking element which is removed from a battery compartment according to Embodiment 2 of the present application.

Referring to FIGS. 5 and 6, a difference between the ball lamp in Embodiment 2 and Embodiment 1 is that the hanging ring 11 is fixedly installed on the hanging part 2. The battery compartment 3 is rectangular in shape, and the battery compartment 3 is fixedly installed on a side of the supporting part 10 facing an inside of the spherical lampshade 1, a side of the battery compartment 3 with the battery port 4 is provided facing an outside of the spherical lampshade 1. The blocking element 5 is in a shape of a plate, and the blocking element 5 damping covers the battery port 4. The circuit board 6 is fixedly installed on a side of the battery compartment 3 facing the inside of the spherical lampshade 1.

Figure 7:
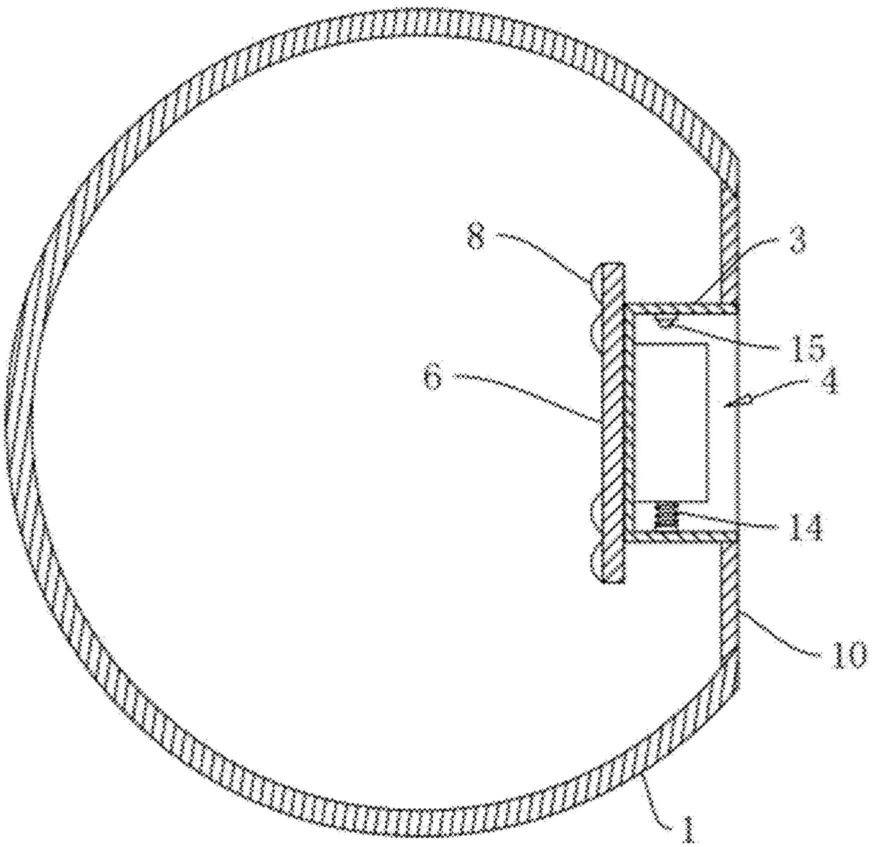
FIG. 7 is a schematic cross-sectional view along line B-B in FIG. 6.

Referring to FIGS. 6 and 7, in the embodiment of the present application, there are three batteries, which are placed side by side in the battery compartment 3 and separated, and adjacent two batteries have opposite polarities. Two opposite side walls of the battery compartment 3 are fixedly installed with conductive strip plates 12 and conductive plates 13, the conductive strip plates 12 are configured for an end of two adjacent batteries to abut against it together, while the conductive plate 13 is configured for an end of one of two batteries, that is, one at a head end and one at a tail end, to abut against, and, the cooperation of the conductive strip plate 12 and the conductive plate 13 connects individual batteries in series.

Referring to FIGS. 6 and 7, a second conductive spring 14 is fixed on a portion of the conductive strip plate 12 and the conductive plate 13 for a negative electrode of the battery to abut against, and a conductive protrusion 15 is provided at a portion of the conductive strip plate 12 and the conductive plate 13 for a positive electrode of the battery to abut against, and the second conductive spring 14 and the conductive protrusion 15 are configured to fix the battery.

Referring to FIGS. 6 and 7, the supporting part 10 is fixedly installed with a second switch 16. A conductive plate 13 is electrically connected to the circuit board 6, the other conductive plate 13 is electrically connected to an end of the second switch 16, and the other end of the second switch 16 is electrically connected to the circuit board 6. The second switch 16 is configured to control connection/disconnection between the voltage regulation circuit on the circuit board 6 and the battery.

The implementation principle of the ball lamp in the embodiment of the present application is: by installing the battery compartment 3 on the supporting part 10, it reduces changes to the spherical lampshade 1, thereby facilitating a production of the spherical lampshade 1. At the same time, when the ball lamp is placed in the horizontal position, the weight of the battery compartment 3 and the battery presses on the supporting part 10, thereby enhancing a stability of the ball lamp when placed in the horizontal position.

Embodiment 3

Figure 8:
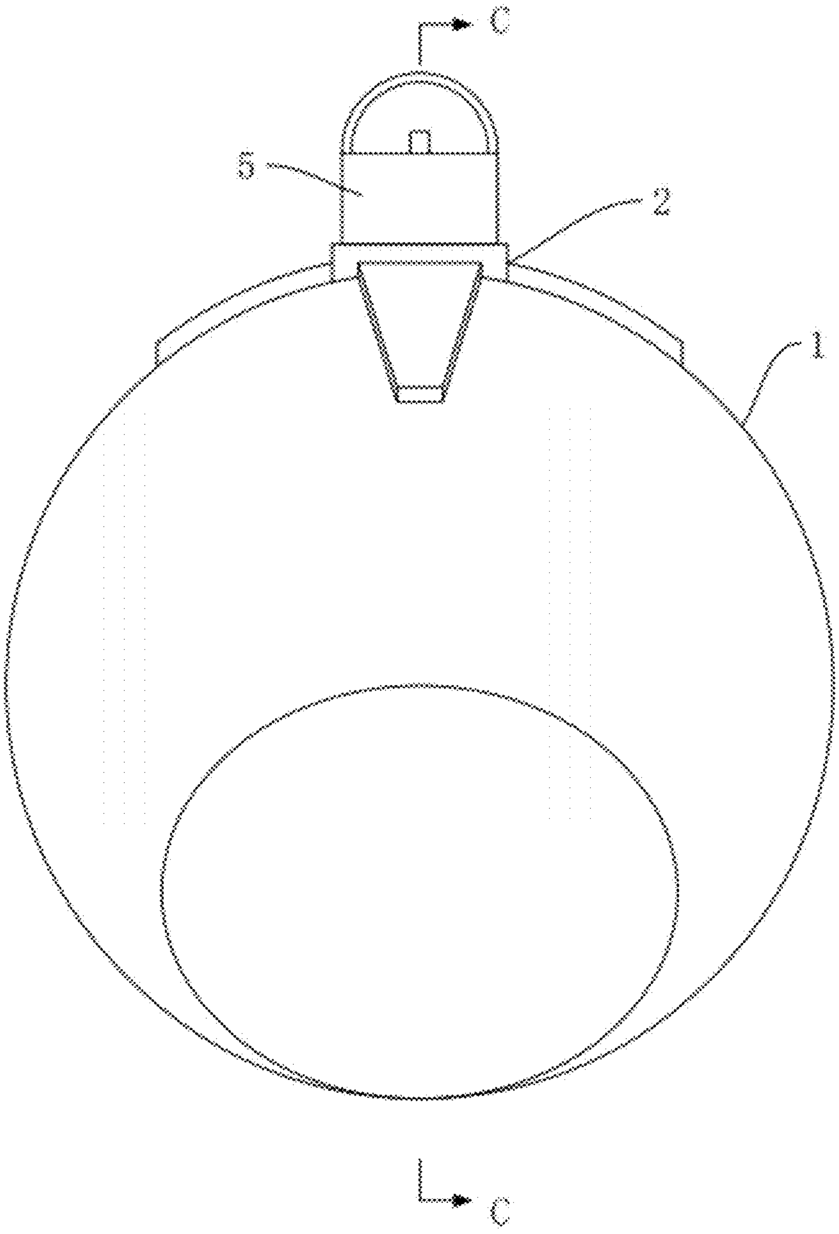
FIG. 8 is an overall schematic structure view according to Embodiment 3 of the present application.
Figure 9:
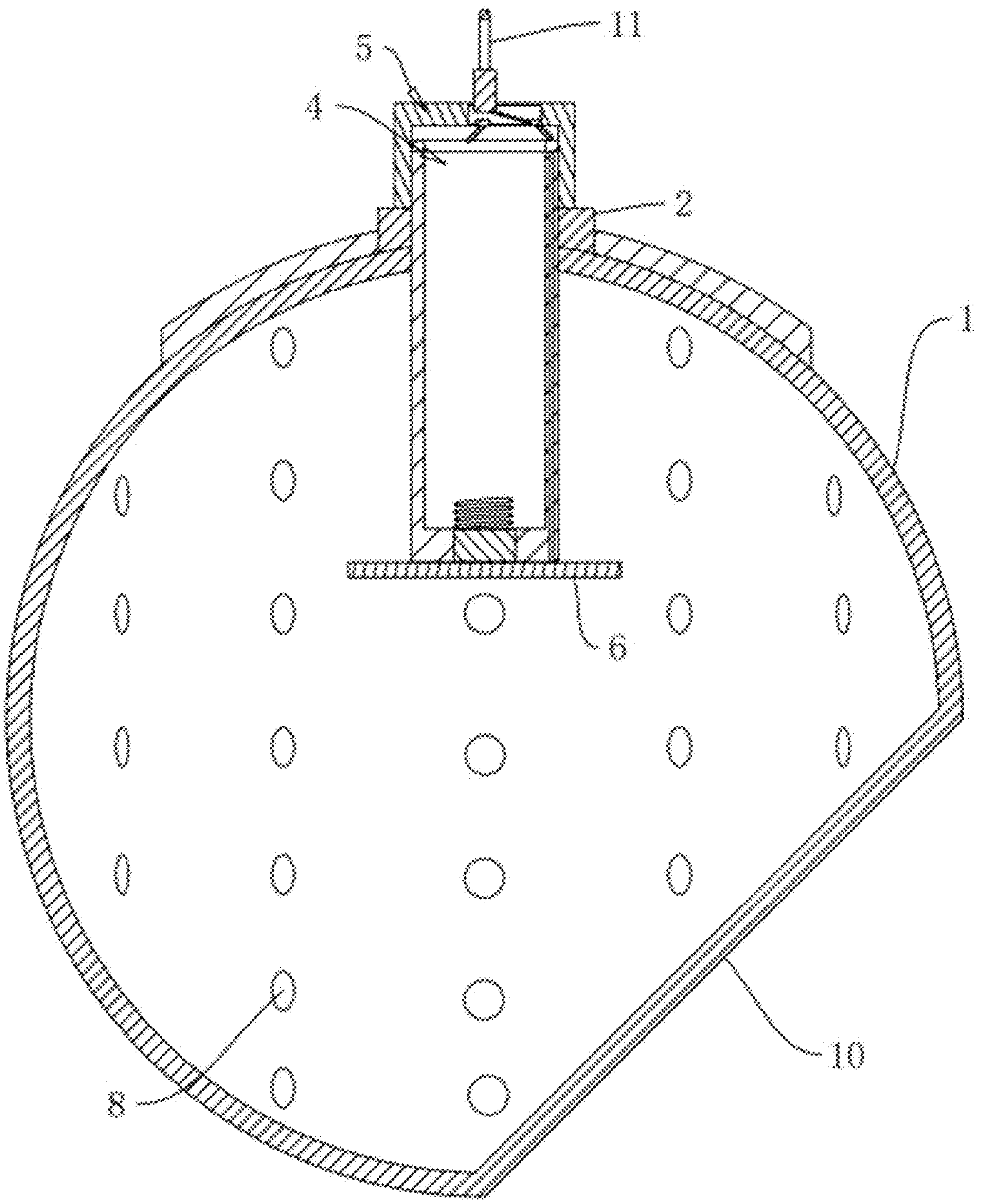
FIG. 9 is a schematic cross-sectional view along C-C in FIG. 8.

Referring to FIGS. 8 and 9, a difference between Embodiment 3 and Embodiment 1 is that a plurality of first light-emitting elements 8 are distributed on an inner wall of the spherical lampshade 1.

Figure 10:
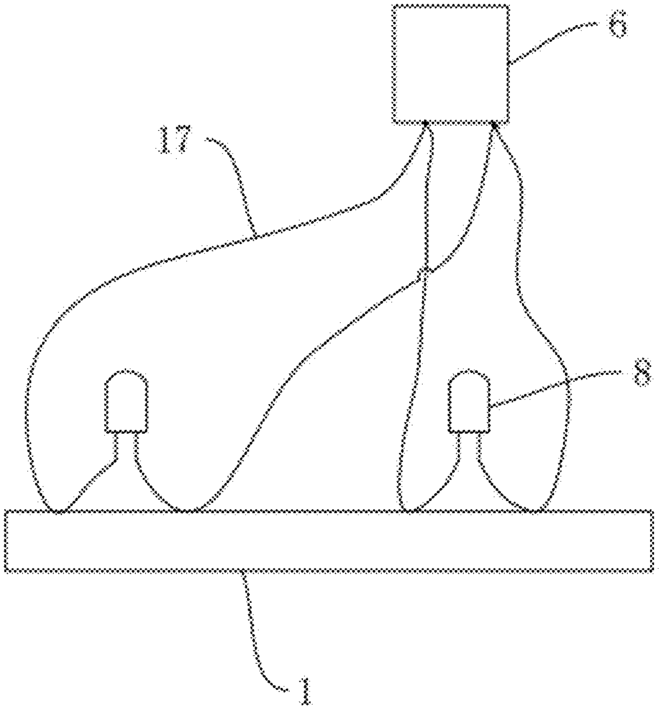
FIG. 10 is a schematic structure view connecting a first light-emitting element and a circuit board according to Embodiment 3 of the present application.
Figure 11:
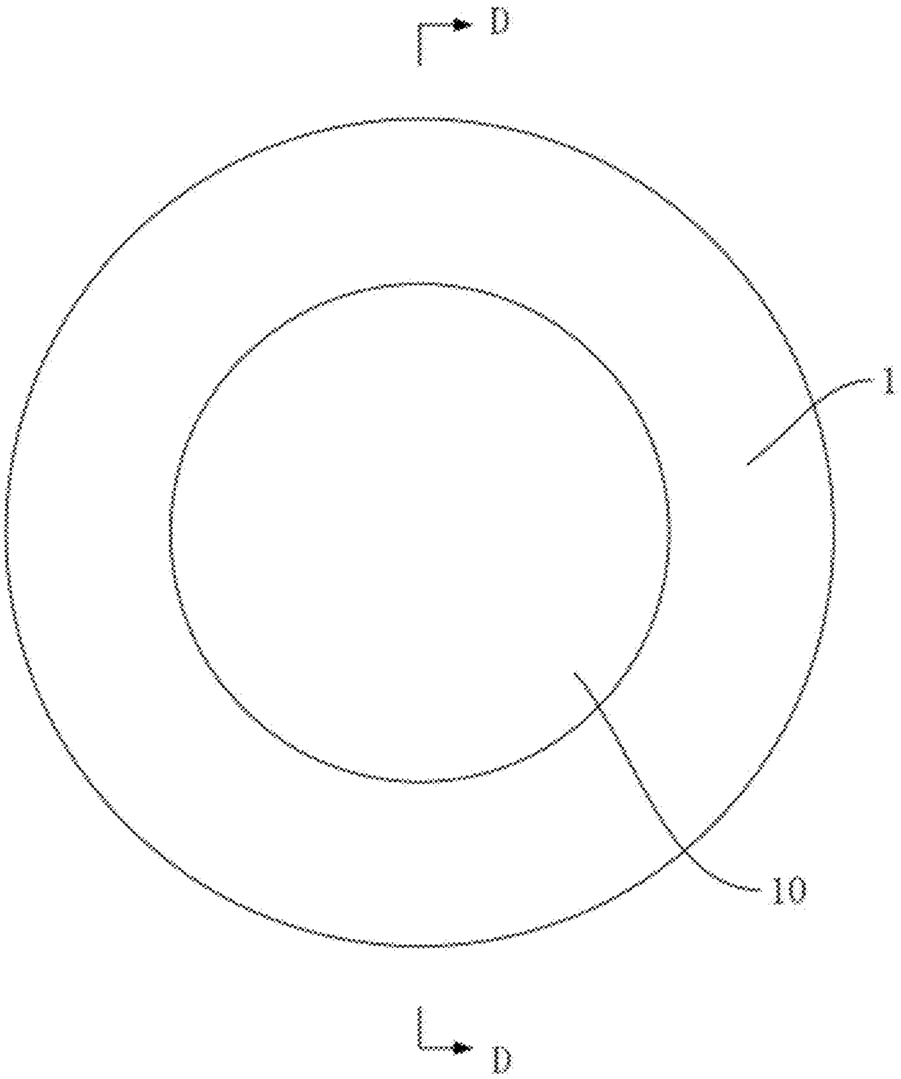
FIG. 11 is an overall schematic structure view of a supporting part which is compressed according to Embodiment 4 of the present application.

Referring to FIGS. 9 and 10, a positive pin and a negative pin of the first light-emitting element 8 are fixedly connected to a first wire 17. Wire body of the first wire 17 is fixedly connected to the inner wall of the spherical lampshade 1, and an end of the first wire 17, departing from the first light-emitting element 8, is electrically connected to the circuit board 6. The voltage regulation circuit on the circuit board 6 regulates the power output from the battery and supplies the power to the first light-emitting element 8.

The implementation principle of the ball lamp in the embodiment of the present application is as follows. The body of the first wire 17 is fixed to the inner wall of the spherical lampshade 1. When the ball lamp is shaken, the first light-emitting element 8 will be also shaken, thereby improving the decorative effect of the ball lamp. In addition, the first light-emitting element 8 is located on the spherical lampshade 1, which is beneficial for improving a brightness of the ball lamp when it emits light.

Embodiment 4

Figure 12:
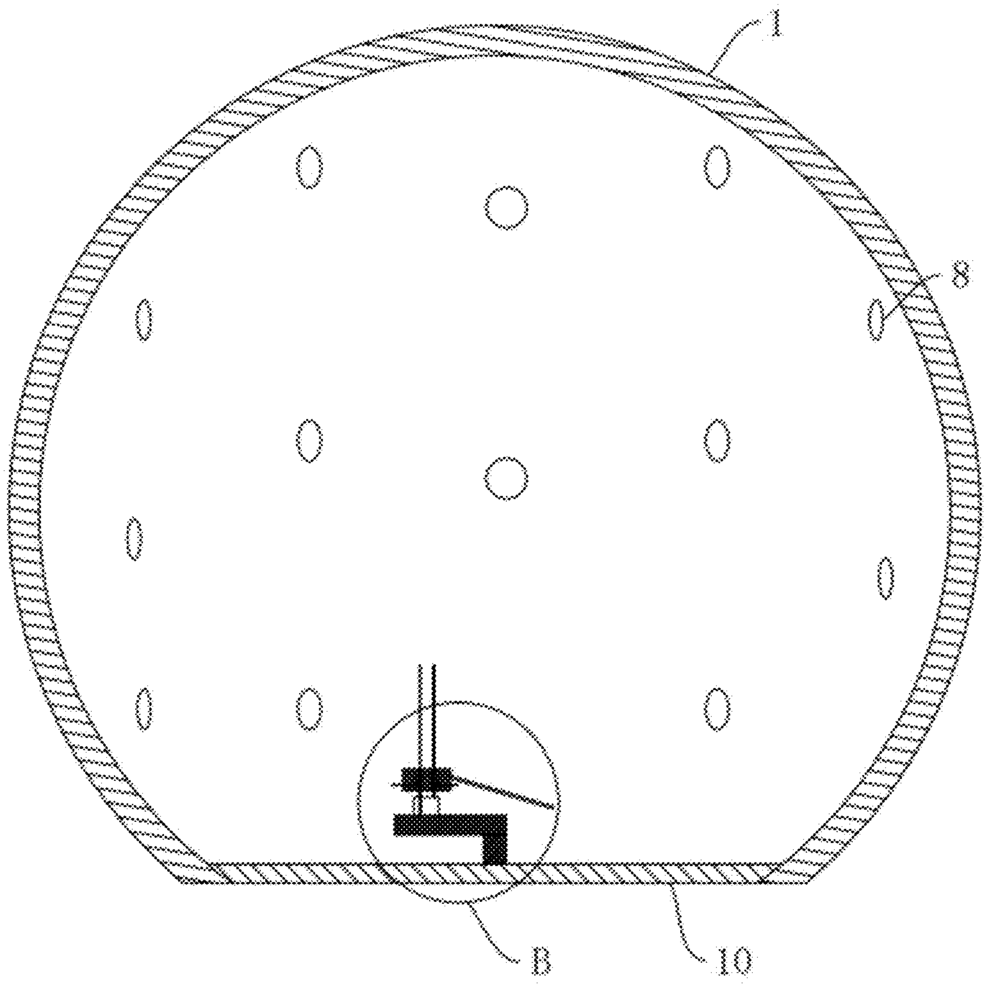
FIG. 12 is a schematic cross-sectional view along line D-D in FIG. 11.
Figure 13:
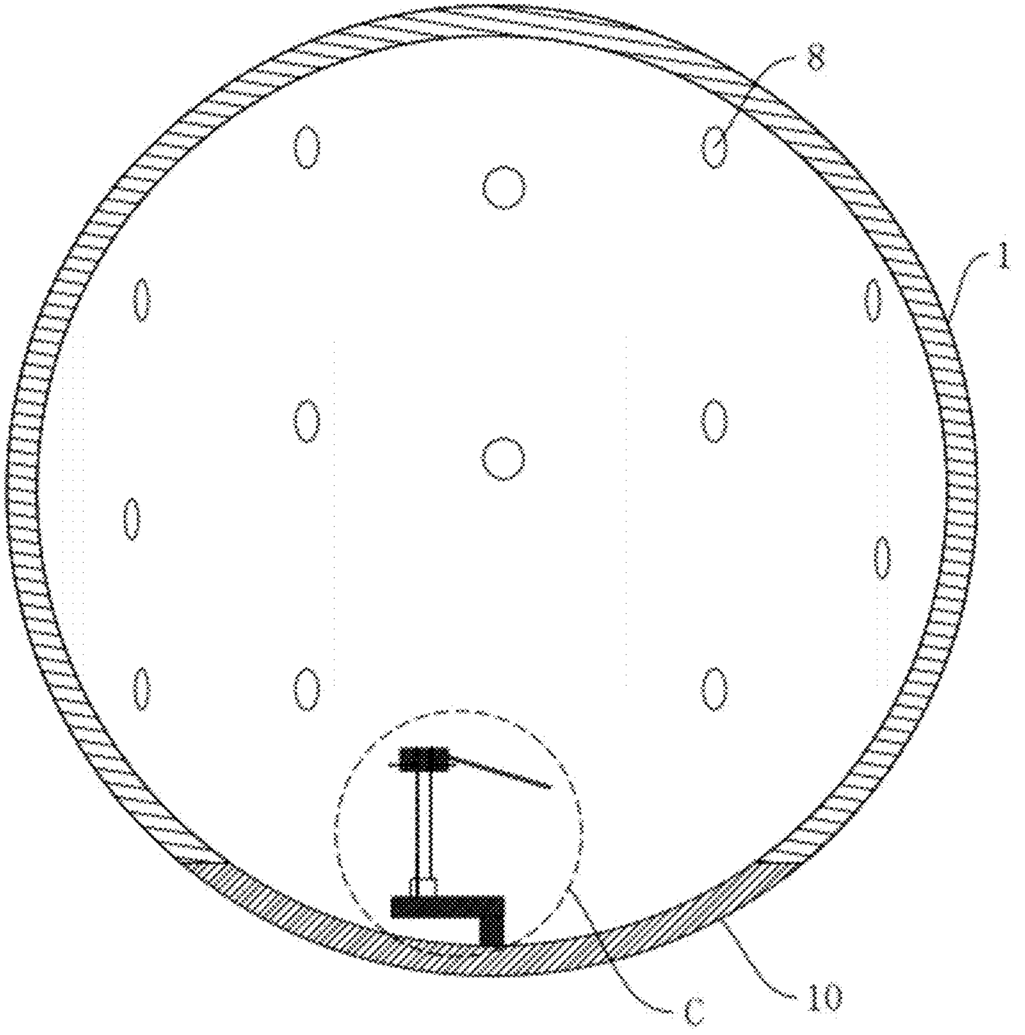
FIG. 13 is a schematic cross-sectional view of a supporting part, which is not compressed, in FIG. 12.

Referring to FIGS. 12 and 13, a difference between Embodiment 4 and Embodiment 3 is that the supporting part 10 is elastic, and the supporting part 10 is configured to be bent outward an outside of the spherical lampshade 1. When hanging the ball lamp, the supporting part 10 is bent towards the outside of the spherical lampshade 1, thereby improving the decorative effect of the ball lamp. When placing the ball lamp in the horizontal position, the supporting part 10 compresses against at the horizontal position and moves towards the interior of the spherical lampshade 1, making it convenient to place the ball lamp in the horizontal position.

Figure 14:
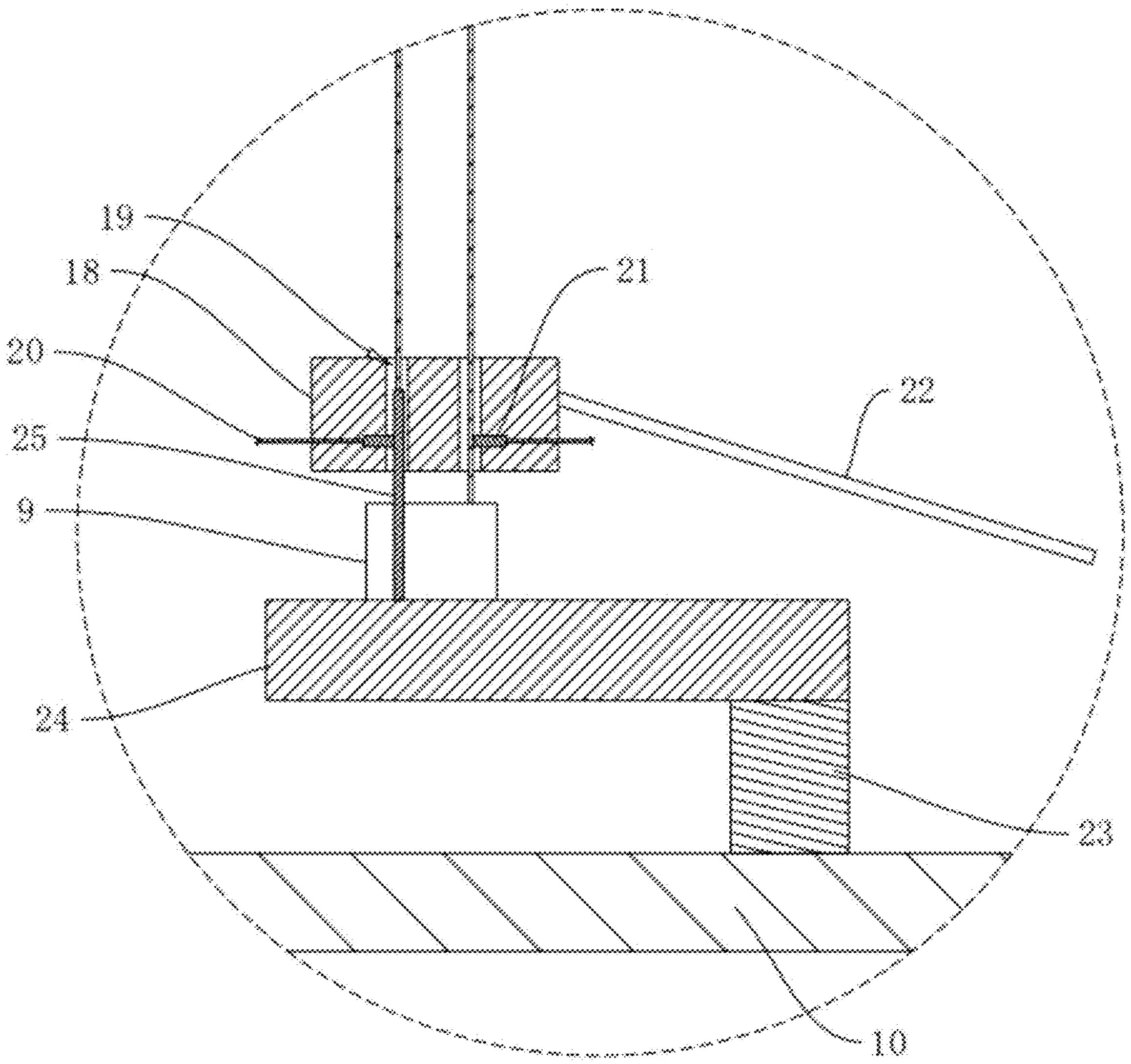
FIG. 14 is an enlarged view of Portion B in FIG. 12.
Figure 15:
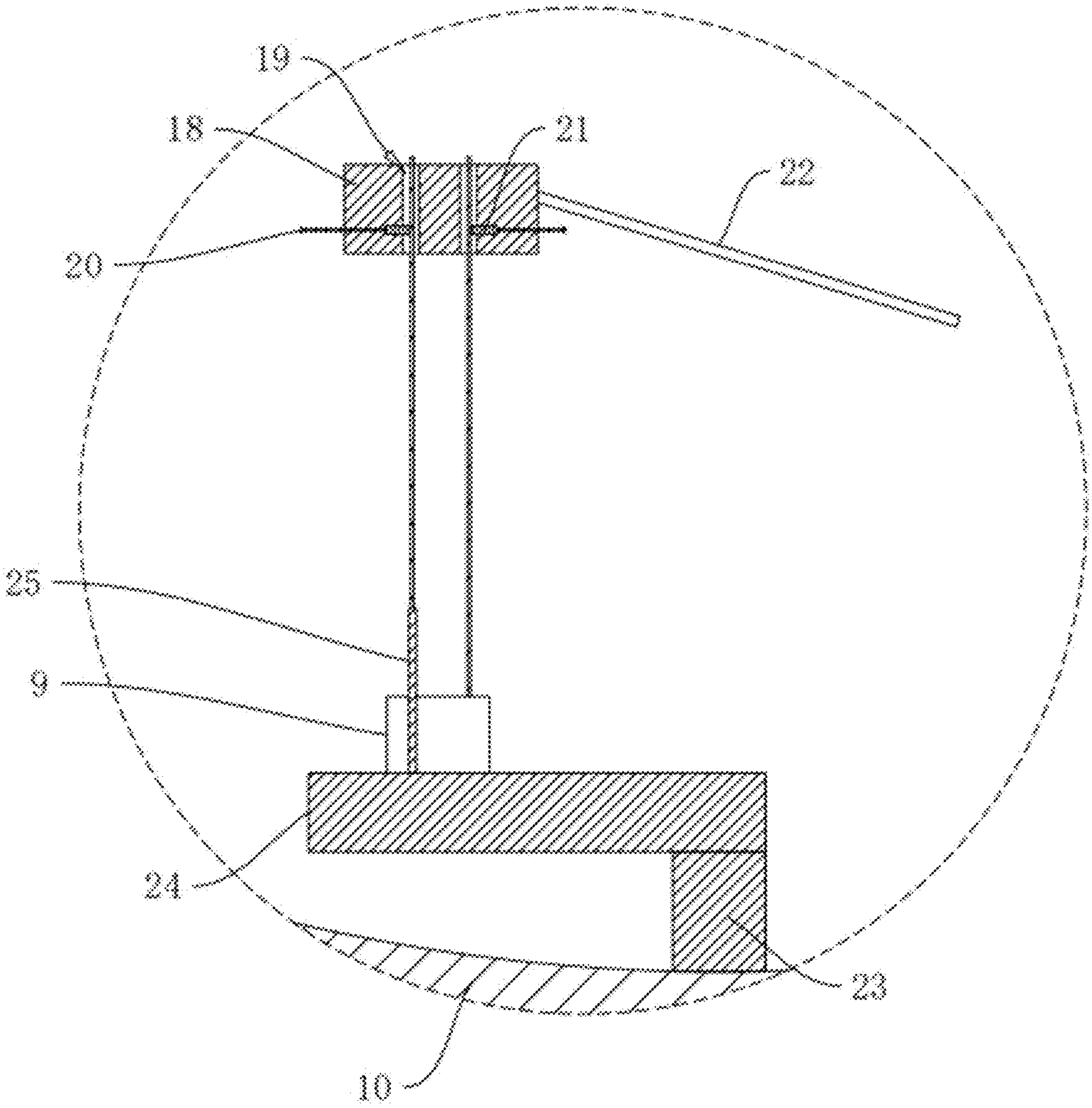
FIG. 15 is an enlarged view of Portion C in FIG. 13.

Referring to FIGS. 14 and 15, on a side facing the inside of the spherical lampshade 1, the supporting part 10 is provided with a second light-emitting element 9 and a connecting base 18. The connecting base 18 is provided with a sliding hole 19 for the positive pin and negative pin of the second light-emitting element 9 to pass through, and both of the positive pin and the negative pin of the second light-emitting element 9 are inserted from an end of the sliding hole 19 away from the supporting part 10.

The positive pin and the negative pin of the second light-emitting element 9 are each provided with a second wire 20, an end of the second wire 20 is fixedly inserted into a side wall of the connecting base 18, and the other end of the second wire 20 is electrically connected to the circuit board 6. The sliding hole 19 is provided with a first conductive strip 21 therein, which is elastic. A side of the first conductive strip 21 is fixedly buried in an inner wall of the sliding hole 19 and fixedly connected to the second wire 20.

By sliding the positive pin and the negative pin of the second light-emitting element 9 in the sliding hole 19, one of the first conductive strips 21 is controlled to abut against or separate from the positive pin of the second light-emitting element 9, and the other of the first conductive strips 21 is controlled to abut against or separate from the negative pin of the second light-emitting element 9.

Referring to FIGS. 14 and 15, a fixing rod 22 is fixedly installed between the side wall of the connecting base 18 and the inner wall of the spherical lampshade 1, and the connecting base 18 is fixed inside the spherical lampshade 1 through the fixing rod 22. A first connecting rod 23 is fixedly installed in a middle of the supporting part 10, and an end of the first connecting rod 23, departing from the supporting part 10, is fixedly connected to the second connecting rod 24. The positive pin of the second light-emitting element 9 is fixedly connected to an insulation rod 25, an end of the insulation rod 25, departing from the second light-emitting element 9, is fixedly connected to the second connecting rod 24. The first connecting rod 23 and the second connecting rod 24 are conducive to connecting the insulation rod 25 with the middle of the supporting part 10. Due to a large deformation caused by compression in the middle of the supporting part 10, a distance required for the insulation rod 25 to move when the supporting part 10 is subjected to compression deformation is increased.

Referring to FIGS. 14 and 15, when the ball lamp is placed in the horizontal position, the supporting part 10 deforms towards the inside of the spherical lampshade 1, and the supporting part 10 pushes the first connecting rod 23 to move. The first connecting rod 23 pushes the second light-emitting element 9 to move through the second connecting rod 24 and the insulation rod 25, thereby separating the positive pin of the second light-emitting element 9 from the first conductive strip 21, and thereby stopping the voltage regulation circuit on the circuit board 6 from supplying power to the second light-emitting element 9. When placing the ball lamp in the horizontal position, light emission is not required at a position where the supporting part 10 is located. By deforming the supporting part 10 towards the inside of the spherical lampshade 1, a connection between the second light-emitting element 9 and the voltage regulation circuit on the circuit board 6 is disconnected, thereby achieving energy-saving effect.

When hanging the ball lamp, the supporting part 10 is bent towards the spherical lampshade 1, the supporting part 10 drives the positive pin of a light-emitting element to be inserted into the sliding hole 19 through the first connecting rod 23, the second connecting rod 24, and the insulation rod 25, so that the positive pin of the second light-emitting element 9 abuts against the first conductive strip 21, thereby facilitating the voltage regulation circuit on the circuit board 6 to supply power to the second light-emitting element 9.

When hanging the ball lamp, the supporting part 10 is deformed towards an outside of the spherical lampshade 1, thereby connecting the second light-emitting element 9 to the voltage regulation circuit on the circuit board 6. After connecting the voltage regulation circuit between the second light-emitting element 9 and the circuit board 6, the second light-emitting element 9 lights up, thereby improving the decorative effect of the ball lamp.

Figure 16:
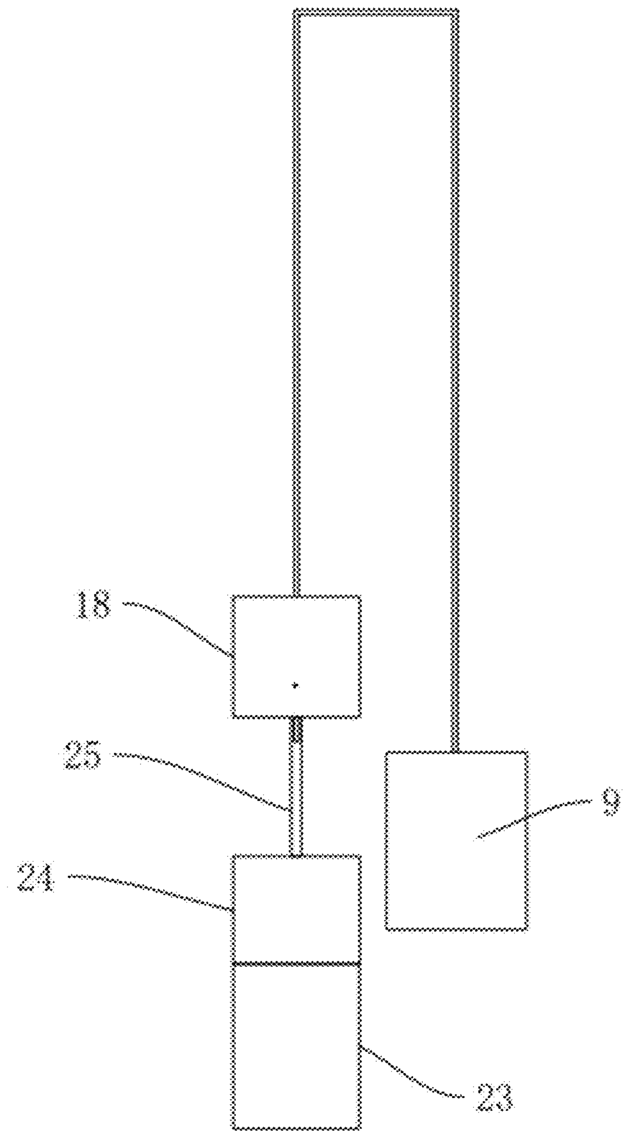
FIG. 16 is a partial schematic structure view according to Embodiment 4 of the present application.

Referring to FIGS. 14 and 16, a lamp body of the second light-emitting element 9 is located between the supporting part 10 and the connecting base 18, thereby reducing occurrence of the light emitted by the second light-emitting element 9 being blocked by the connecting base 18. The positive pin and the negative pin of the second light-emitting element 9 are both inserted from the end of the sliding hole 19 away from the supporting part 10 in a bent manner.

In the embodiment of the present application, there is only one second light-emitting element 9. When the supporting part 10, due to no compression, is bent towards the outside of the spherical lampshade 1, the positive pin and the negative pin of the second light-emitting element 9 will abut against a side of the connecting base 18 departing from the supporting part 10, thereby reducing a protrusion of the supporting part 10 caused by the weight of the first connecting rod 23, the second connecting rod 24, and the second light-emitting element 9.

In another embodiment, there are two or more second light-emitting elements 9. When the supporting part 10, due to no compression, is bent towards the outside of the spherical lampshade 1, the positive pin and the negative pin on the second light-emitting element 9 facing the first connecting rod 23 abut against the side of the connecting base 18 away from the supporting part 10.

The connecting base 18, the first connecting rod 23, and the second connecting rod 24 are all made of transparent materials such as plastic and glass, thereby reducing a situation where the connecting base 18, the first connecting rod 23, and the second connecting rod 24 block the light.

The implementation principle of the ball lamp in Embodiment 4 is as follows. When the ball lamp is hung up, the supporting part 10 is not compressed, and the supporting part 10 is bent towards the outside of the spherical lampshade 1, the supporting part 10 is connected to the first connecting rod 23, the second connecting rod 24, and the insulation rod 25 to make the positive pin of the second light-emitting element 9 touch the first conductive strip 21. Then, the voltage regulation circuit on the circuit board 6 supplies the battery output voltage to the second light-emitting element 9, so that the second light-emitting element 9 lights up. By the lighting up the first light-emitting element 8 and the second light-emitting element 9 at the same time, the decorative effect of the ball lamp when being hung up is improved.

When placing the ball lamp in the horizontal position, the supporting part 10 is compressed and moves towards the inside of the spherical lampshade 1, so as to separate the positive pin of the second light-emitting element 9 from the first conductive strip 21 through the first connecting rod 23, the second connecting rod 24, and the insulation rod 25, thereby disconnecting the second light-emitting element 9 from the voltage regulation circuit on the circuit board 6 to turn off the second light-emitting element 9. When the ball lamp is placed in the horizontal position, the second light-emitting element 9 is turn off, thereby achieving energy-saving effect.

The above are the preferred embodiments of the present application, which are not intended to limit the protection scope of the present application. Therefore, all equivalent changes made according to the structure, shape and principle of the present application should be covered within the protection scope of the present application.

LISTING OF REFERENCE SIGNS

1. Spherical Lampshade;
2. Hanging Part;
3. Battery Compartment;
4. Battery Port;
5. Blocking Element;
6. Circuit Board;
7. Conductive Assembly;
71. First Conductive Spring;
72. Second Conductive Strip;
73. Third Conductive Strip;
74. First Switch;
75. Conductive Column;
76. Conductive Ring;
77. Conductive Wire;
8. First Light-Emitting Element;
9. Second Light-Emitting Element;
10. Supporting Part;
11. Hanging Ring;
12. Conductive Strip Plate;
13. Conductive Plate;
14. Second Conductive Spring;
15. Conductive Protrusion;
16. Second Switch;
17. First Wire;
18. Connecting Base;
19. Sliding Hole;
20. Second Wire;
21. First Conductive Strip;
22. Fixing Rod;
23. First Connecting Rod;
24. Second Connecting Rod;
25. Insulation Rod;
26. Reinforcing Plate.

What is claimed is:

1. A ball lamp, comprising: a spherical lampshade, wherein an outer wall of the spherical lampshade is provided with a hanging part, the spherical lampshade is provided with a lighting device, and the lighting device provides a light source for an interior of the spherical lampshade, wherein the lighting device comprises a first light-emitting element, a battery compartment, a blocking element, and a circuit board, the battery compartment is defined with a battery port for receiving a battery, the blocking element is detachably installed at the battery port of the battery compartment, the first light-emitting element is electrically connected to the circuit board, the circuit board is provided with a voltage regulation circuit, the voltage regulation circuit is configured to supply power to the first light-emitting element after regulating a voltage output by the battery, the circuit board is fixedly installed on the battery compartment, and the first light-emitting element is provided in the spherical lampshade, wherein the lighting device is installed on the hanging part, the battery compartment is cylindrical in shape, the blocking element is a threaded cover, an end of the battery compartment fixedly extends through the hanging part, a second end of the battery compartment with the battery port faces an outside of the spherical lampshade, the blocking element is threadedly provided in the second end of the battery compartment with the battery port, the circuit board is fixedly installed on a side of the battery compartment facing the interior of the spherical lampshade, and the first light-emitting element is fixedly installed on the circuit board.

2. The ball lamp according to claim 1, wherein the battery compartment is installed with a conductive assembly, the conductive assembly comprises a first conductive spring, a second conductive strip, a first switch, a third conductive strip, a conductive column, a conductive ring, and a conductive wire, the conductive column is fixedly embedded at a third end of the battery compartment departing from the blocking element, the first conductive spring is fixedly installed on an inner wall of the battery compartment departing from the blocking element, a first end of the conductive column is electrically connected to the circuit board, a second end of the conductive column is fixedly connected to a first end of the first conductive spring, a second end of the first conductive spring is configured to abut against the battery, the second conductive strip and the third conductive strip are fixedly installed on an inner wall of the blocking element, the first switch is fixedly installed on the blocking element, a first end of the first switch is electrically connected to the second conductive strip, a second end of the first switch is electrically connected to the third conductive strip, the conductive ring is fixedly installed on a side of the hanging part departing from the spherical lampshade, the second conductive strip is configured to abut against the battery, the third conductive strip is configured to abut against the conductive ring, the conductive wire is buried in a side wall of the battery compartment, a first end of the conductive wire is fixedly connected to the conductive ring, and a second end of the conductive wire is electrically connected to the circuit board.

3. The ball lamp according to claim 1, wherein the outer wall of the spherical lampshade is further provided with a supporting part, the supporting part is located at one side of a central axis passing through the hanging part and a center of a ball, on a side of the supporting part facing the interior of the spherical lampshade, a second light-emitting element is installed on the supporting part, a positive pin and a negative pin of the second light-emitting element are both electrically connected to a second wire, an end of the second wire departing from the second light-emitting element is electrically connected to the lighting device, the lighting device is configured to supply power to the second light-emitting element, the supporting part is elastic, and the supporting part is configured to bend toward the outside of the spherical lampshade.

4. The ball lamp according to claim 3, wherein the positive pin of the second light-emitting element is fixedly connected to an insulation rod, an end of the insulation rod departing from the second light-emitting element is fixedly connected to the side of the supporting part facing the interior of the spherical lampshade, the second light-emitting element is provided with a connecting base, the connecting base is provided with a sliding hole, the positive pin and the negative pin of the second light-emitting element are both inserted from an end of the sliding hole departing from the supporting part, an inside of the sliding hole is defined with a first conductive strip, the first conductive strip is elastic, a second end of the second wire facing the second light-emitting element is fixedly connected to a side of the first conductive strip and both the second light-emitting element and the first conductive strip are fixedly buried in the connecting base, and a fixing rod is fixedly installed between the connecting base and an inner wall of the spherical lampshade.

5. The ball lamp according to claim 4, wherein a lamp body of the second light-emitting element is located between the supporting part and the connecting base, and the positive pin and the negative pin of the second light-emitting element are both bent to be inserted from the end of the sliding hole departing from the supporting part.

6. The ball lamp according to claim 5, wherein when the supporting part is not compressed, the positive pin and the negative pin of the second light-emitting element abut against a side of the connecting base departing from the supporting part.

7. The ball lamp according to claim 4, wherein a first connecting rod is fixedly installed in a middle of the supporting part, and a second connecting rod is fixedly installed between an end of the first connecting rod departing from the supporting part and the insulation rod.

8. A ball lamp, comprising: a spherical lampshade, wherein an outer wall of the spherical lampshade is provided with a hanging part and a supporting part, the supporting part is located at one side of a central axis passing through the hanging part and a center of a ball, the spherical lampshade is provided with a lighting device, the lighting device provides a light source for an interior of the spherical lampshade, wherein the lighting device comprises a first light-emitting element, a battery compartment, a blocking element, and a circuit board, the battery compartment is defined with a battery port for receiving a battery, the blocking element is detachably installed at the battery port of the battery compartment, the first light-emitting element is electrically connected to the circuit board, the circuit board is provided with a voltage regulation circuit, the voltage regulation circuit is configured to supply power to the first light-emitting element after regulating a voltage output by the battery, the circuit board is fixedly installed on the battery compartment, and the first light-emitting element is provided in the spherical lampshade, wherein the lighting device is installed on the supporting part, the battery compartment is rectangular in shape, the battery compartment is fixedly installed on the supporting part, and a side of the battery compartment with the battery port faces an outside of the spherical lampshade, the blocking element is in a shape of a plate, and the blocking element is configured to cover the battery port.

* * * * *